Figure 3:
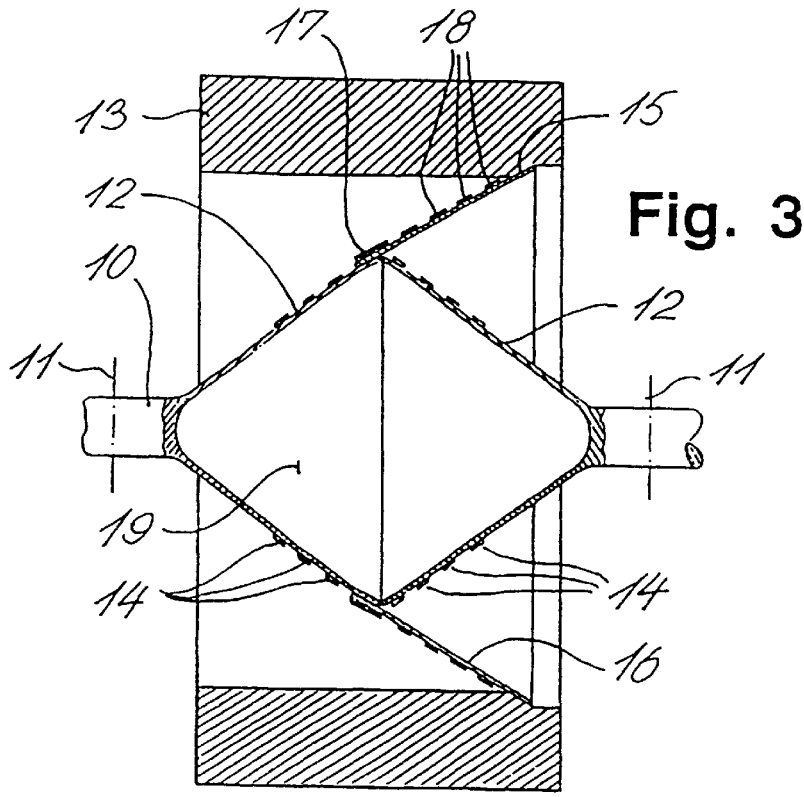

United States Patent [19]
Waagepetersen

[11] Patent Number: 5,946,979
[45] Date of Patent: Sep. 7, 1999

[54] FLYWHEEL

[75] Inventor: Gaston Birger Fog Waagepetersen, Helsingor, Denmark

[73] Assignee: Forskningscenter Riso, Roskilde, Denmark

[21] Appl. No.: 08/856,549

[22] Filed: May 15, 1997

Related U.S. Application Data

[63] Continuation of application No. PCT/DK95/00455, Nov. 16, 1995.

[30] Foreign Application Priority Data

Nov. 16, 1994 [DK] Denmark .................................. 1311/94

[51] Int. Cl.$^6$ ...................................................... G05G 1/00
[52] U.S. Cl. ............................................ 74/572; 74/573 R
[58] Field of Search ........................ 74/572–574; 464/180

[56] References Cited

U.S. PATENT DOCUMENTS

| | | |
|---|---|---|
| 1,332,966 | 3/1920 | Werner . |
| 3,077,541 | 2/1963 | Valus . |
| 4,080,845 | 3/1978 | Hatch ........................................ 74/572 |
| 4,123,949 | 11/1978 | Knight ...................................... 74/572 |
| 4,220,055 | 9/1980 | Dubois et al. ......................... 74/573 R |
| 4,370,899 | 2/1983 | Swartout . |
| 4,666,753 | 5/1987 | Matsuka et al. ........................ 428/408 |

FOREIGN PATENT DOCUMENTS

| | | |
|---|---|---|
| 160637 | 4/1991 | Denmark . |
| 0 066 040 | 12/1982 | European Pat. Off. . |
| 0 181 736 | 6/1996 | European Pat. Off. . |
| 63-125841 | 5/1988 | Japan . |
| 379 837 | 10/1975 | Sweden . |
| 796 577 | 1/1981 | U.S.S.R. . |
| 1516-664 | 10/1989 | U.S.S.R. . |
| WO 93 24765 | 12/1993 | WIPO . |

*Primary Examiner*—Vinh T. Luong
*Attorney, Agent, or Firm*—Merchant & Gould P.C.

[57] ABSTRACT

A flywheel comprises an annular body (13) which is arranged on a rotatably mounted metallic shaft (10). The shaft has at least one hollow shaft part (12) having an outer surface part coextending or diverging outwardly in relation to the axis of the shaft and defining a surface of revolution, which is coaxial with the shaft. The hollow shaft part (12) is interconnected with the annular body 913) so as to allow radial expansion of the latter under the influence of centrifugal forces. At least part of the outer surface part of the hollow shaft part (12) is backed up by generally peripherally extending reinforcing fibers (14) so as to allow the flywheel to rotate at an increased rotational speed.

15 Claims, 3 Drawing Sheets

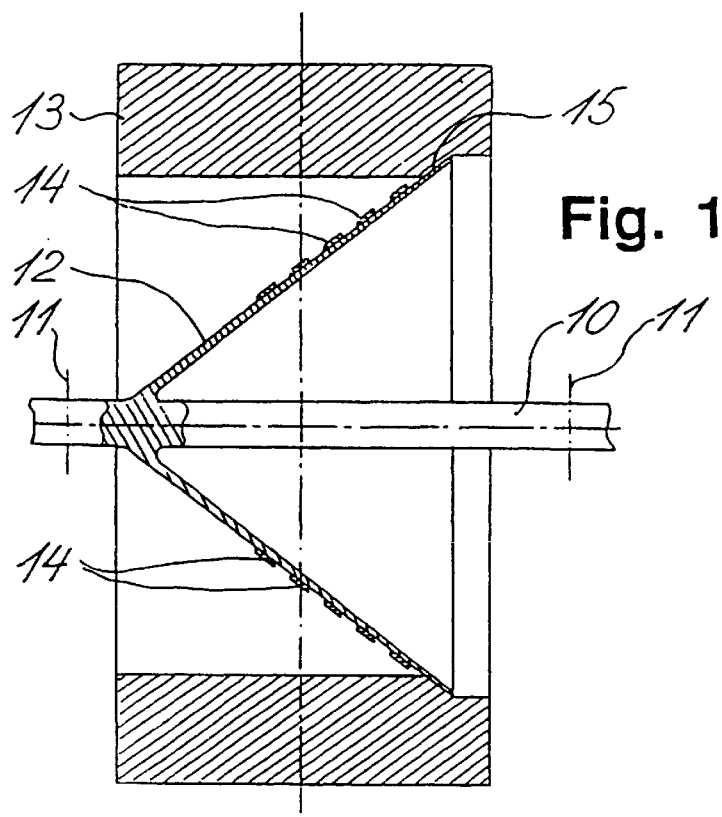

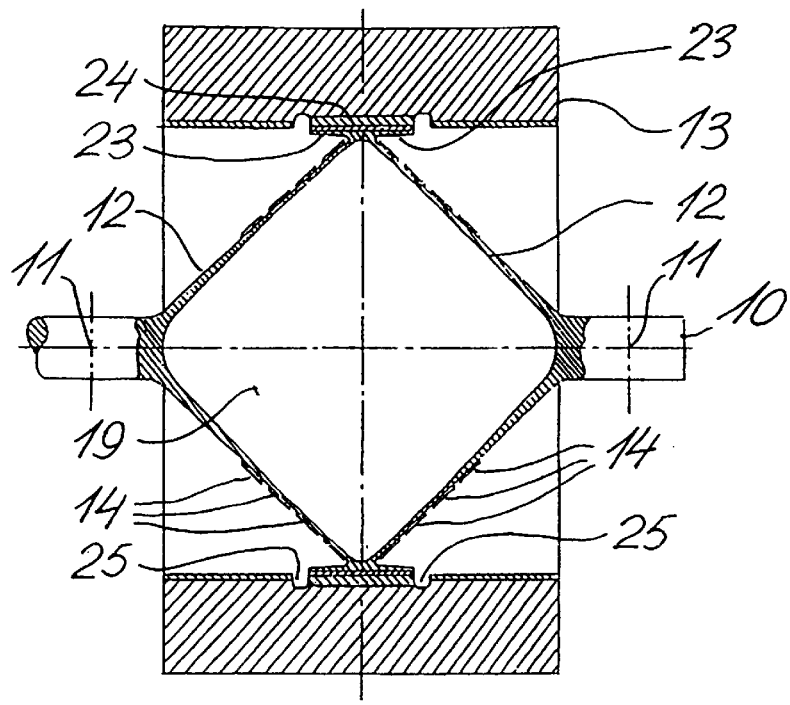
Fig. 5
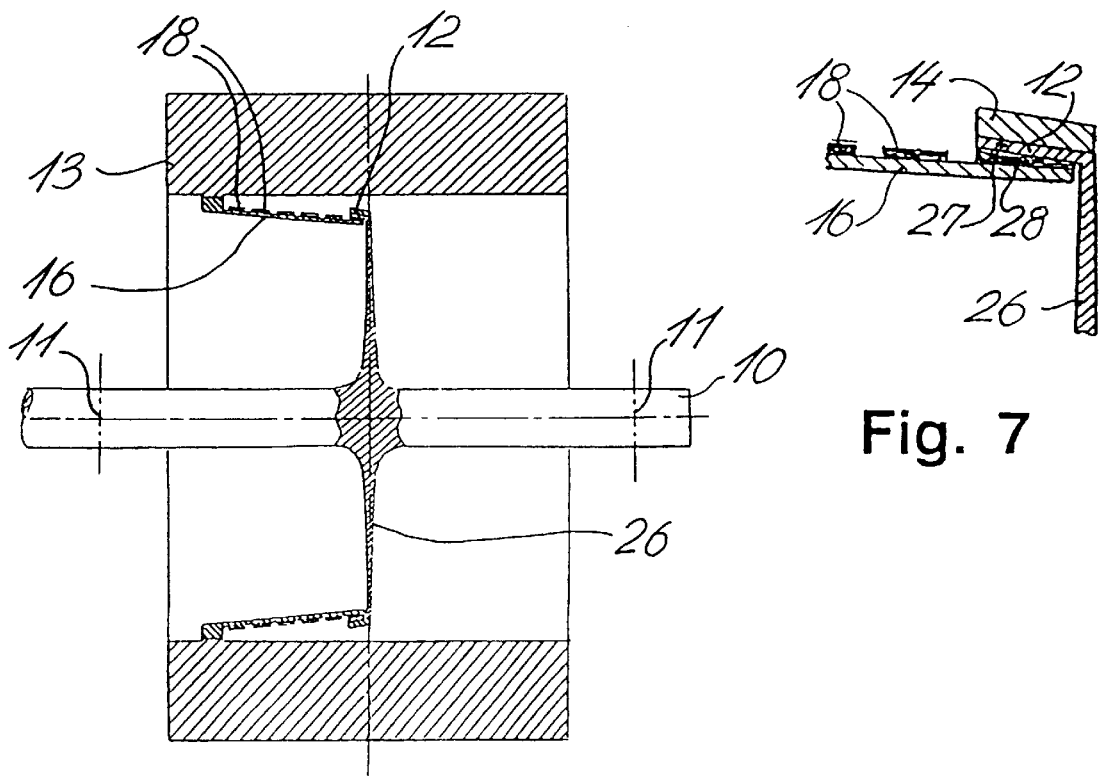
Fig. 6
Fig. 7

FLYWHEEL

This is a continuation of PCT/DK 95/00455 application filed Nov. 16, 1995.

The present invention relates to a flywheel comprising an annular body, a metallic shaft including at least one hollow shaft part having an outer surface part coextending with or diverging outwardly in relation to the axis of the shaft and defining a surface of revolution, which is coaxial with the shaft, said at least one hollow shaft part being interconnected with the annular body so as to allow radial expansion of the latter under the influence of centrifugal forces, and means for mounting the shaft rotatably about its axis.

A flywheel of the above type, wherein the hollow shaft part defines a conical outer surface part and is interconnected with the annular flywheel body by means of a cylindrical or conical shell of fiber reinforced plastics material, is disclosed in WO93/24765. The maximum rotational speed of the known flywheel is limited by the maximum allowable tangential stresses in the hollow metallic shaft part caused by the centrifugal forces induced.

The present invention has for its object to provide an improved flywheel of the above type which may be rotated at substantially increased rotational speed. The flywheel according to the invention is characterized in that at least part of the outer surface part is backed-up by generally peripherally extending reinforcing fibers so as to allow the flywheel to rotate at an increased rotational speed.

The reinforcing fibers applied to the diverging outer surface part should be prevented from moving axially in relation to the hollow shaft part. In principle, this could be obtained by partly or totally embedding the reinforcing fibers in the metallic material of the hollow shaft part. In practice, however, it would be rather difficult to embed the substantially peripherally extending reinforcing fibers in the metallic material in its molten condition. Therefore, the reinforcing fibers are preferably retained in its axially position by other means. Thus, the reinforcing fibers may be received in annular or spiral grooves formed in the outer surface part of the hollow shaft part, or the reinforcing fibers may be adhesively connected to the outer surface of the hollow shaft part. In a preferred embodiment, the reinforcing fibers are embedded in a plastics material applied to the outer surface part. The reinforcing fibers may then be wound on the outer surface part prior or subsequent to the application of the plastics material in its plastic or molten condition. The plastics material may, for example, be heated by means of laser light and cooled when the fibers have been embedded in the heated thermoplastic material.

In a preferred embodiment, however, the reinforcing, generally peripherally extending fibers may have been formed into annular backing-up members, which have consecutively been applied to the outer surface part, and such fiber reinforced annular members may subsequently be adhesively fastened to the diverging outer surface part.

In principle, the annular body of the flywheel may be of any suitable material, such as metal. However, in practice the annular body is preferably made from fiber reinforced plastics material. The hollow shaft part may be connected directly to the annular body, for example by means of an adhesive and/or by means of a mechanical joint, and the hollow shaft part may then be sufficiently flexible to allow radial expansion of the tubular body, when the flywheel is rotating. Alternatively, the hollow shaft part may be interconnected with the annular body by flexible connecting means. The connecting means may be of any kind having a sufficient strength to transmit the torque from the energy transmission and a possible gyro moment between the annular body and the shaft and a sufficient flexibility or resiliency to allow the annular body to expand under the influence of the centrifugal forces. Preferably, the connecting means comprise an annular wall part made from fiber reinforced plastics material.

The hollow shaft part may define an axially open ended cavity therein. Alternatively, the flywheel may comprise a pair of aligned hollow shaft parts having opposed open ends, which have been interconnected so as define a closed hollow space. Each outer surface part may be a surface of revolution having a convexly or concavely curved, a rectilinear, or an angled generatrix. Preferably, each outer surface part substantially defines a conical or frusto-conical surface.

When the flywheel comprises a pair of hollow shaft parts which have been interconnected so as to define a substantially closed hollow space, oppositely extending, substantially cylindrical flanges may be formed on the radially outer rim portions of the hollow shaft parts, and the cylindrical flanges may then be fastened to an inner peripheral surface of the annular body by suitable fastening means, such as glue or mechanical fastening means.

According to another embodiment the hollow shaft part extends axially from a radial flange formed on the shaft. The hollow shaft part, which may be a substantially circularly cylindrical or slightly conical collar or flange may then be connected to the annular body by flexible connecting means of the type described above.

Each outer surface part may be backed-up by a substantially uniform layer of fibers so that the strength of the fibers covering each axial unit of length of the outer surface part is substantially the same along the length of such surface part. Preferably, however, the total strength of the backing-up fibers per unit length of the shaft increases with increasing diameter of the diverging surface part. This means that the total strength of the layer of fibers covering a length unit of the diverging surface part increases with increasing diameter along the length of the shaft. Such increase of total fiber strength may be obtained by varying the material of the fibers, the dimensions of the individual fibers, the type of the fibers, the density of the fibers, and/or the number of fibers covering each unit of length.

The diameter of the flexible interconnecting means may increase from the hollow shaft part towards the annular body and may, for example, be in the form of a conical or frusto-conical shell. Alternatively, the radially outer location of the hollow shaft part may substantially correspond to the diameter of an inner portion of the annular body to which the hollow shaft is connected. The hollow shaft part may then be connected to the annular body directly or via flexible interconnecting means, which may, for example, be a substantially circularly cylindrical shell-like member.

The peripherally extending windings of the reinforcing fibers may be located at the desired axial positions of the hollow shaft part or parts for reducing the deflexions and stresses of the various wall parts of the hollow shaft part caused by the centrifugal and gyro forces. The thickness and the total strength of the fiber layers arranged at the various axial positions may be chosen so that the deflexion of the wall of the hollow shaft part and the bending stresses therein may be controlled as desired. When the flywheel is rotating the hollow shaft part is influenced by higher centrifugal forces at larger diameters than at smaller diameters. Within rather wide limits the deflexions or the radial extensions of the diverging hollow shaft part may be controlled as desired by applying reinforcing fibers having a suitable total strength to various axial positions of the hollow shaft part.

When the outer surface part of each hollow shaft part is frusto-conical, the reinforcing fibers is preferably dimensioned and arranged on the outwardly diverging surface part so as to obtain at maximum rotational speed of the flywheel such a deflexion of the wall of each hollow shaft part that a generatrix of its diverging outer surface part generally attains an S-shape, while the stresses generated in the metallic material of the hollow part does not exceed an allowable value. The radial extension of the hollow shaft part at the section thereof having the larger diameter should be so as to not exceed the allowable tangential stress of the metallic shaft material, and the angle defined by the shaft axis and the tangent angle of the generatrix at said outer location of the hollow shaft part should preferably remain substantially unchanged when the rotational speed of the flywheel is increased from zero to its maximum rotational speed. The deflexion of the generatrix is also approximately zero at an inner location of the hollow shaft part having a minimum outer diameter.

Generally speaking, at each of a number of axially spaced locations of the hollow shaft part the number of the peripherally extending reinforcing fibers should be adjusted to secure that the centrifugal forces acting on the metallic material of the hollow shaft part and on the reinforcing fibers and their possible matrix is counterbalanced by the reacting peripheral stresses of the metallic material of the hollow shaft part and of the reinforcing fibers. When the hollow shaft part is provided with reinforcing fibers according to the present invention it is possible to increase the rotational speed on the flywheel by approximately 50%, and the maximum diameter of the hollow shaft part may be increased to a similar value as the inner diameter of the annular body. The annular shaft part may then be connected to the annular body either directly or by means of a substantially circularly cylindrical flexible connecting wall part having a relatively large diameter. Because of the relatively large diameter the stresses induced in the connecting wall part due to gyro forces are relatively low.

Also the adhesive joints or heat sealed joints between the interconnecting annular wall part and the annular body and the hollow shaft part, respectively, will then be exposed to only relatively low forces.

The invention will now be further described with reference to the drawings, wherein FIG. 1–6 are side views and partially sectional views of different embodiments of the flywheel according to the invention, and FIG. 7 is a fragmentary sectional view showing a detail of the embodiment illustrated in FIG. 6.

The flywheel shown in the drawings comprises a shaft 10 which is made from a metal, such as aluminum, or a metal alloy, and which is rotatably supported at 11 in suitable bearings, not shown. The shaft 10 comprises at least one radially outwardly extending hollow shaft part 12 which in the embodiment shown in the drawings is in the form of a conical or frusto-conical, relatively thin wall being coaxial with the shaft 10. An annular flywheel body 13, which is preferably made from a fiber reinforced plastics material, is connected to a radially outer portion of the hollow shaft part 12.

In order to strengthen the hollow shaft part or parts 12 and to limit deflexion on the same under the influence of the centrifugal forces substantially peripherally extending reinforcing fibers have been applied to the outer surface of the hollow shaft part 12. In the embodiments shown in the drawings the reinforcing fibers are embedded in a matrix of plastics material, such as epoxy or PEEK, so as to form reinforcing annular members 14 which are applied to the conical outer surface of the hollow shaft parts 12 at axially spaced locations.

In the embodiment shown in FIG. 1 the only hollow shaft part 12 is directly connected to the annular flywheel body 13 at its radially outer end. Thus, a radially outer rim portion of the hollow shaft part 12 may be engaging with a complementary annular surface part 15 formed by the radially inner surface of the annular flywheel body 13. The body 13 and the hollow shaft part 12 may, for example, be interconnected by a glue connection. It should be understood that in the embodiment shown in FIG. 1 the hollow shaft part or the conical wall 12 should be sufficiently flexible to allow radial expansion of the flywheel body 13 under the influence of centrifugal forces when the flywheel is rotating at maximum speed. In the embodiment shown in FIG. 1 the hollow shaft part 12 is preferably formed integrally with the cylindrical shaft part. Alternatively, the hollow shaft part 12 may extend outwardly from a hub portion which has been keyed to or otherwise fastened to the cylindrical shaft part.

In the embodiment shown in FIG. 2 the maximum outer diameter of the hollow shaft part 12 is substantially smaller than the inner diameter of the annular flywheel body 13, and the outer free rim portion of the hollow shaft part 12 is interconnected with the annular flywheel body 13 by means of a frusto-conical connecting part 16, which is preferably made from fiber reinforced plastics material. The connecting part 16 may be connected to the hollow shaft part 12 by means of an adhesive or a glue, while the outer rim portion of the connecting part 16 may be fastened to an inner conical surface part of the flywheel body 13 by heat sealing, fusing, or glueing. The joint or connection between the hollow shaft part 12 and the frusto-conical connecting part 16 may be backed up by means of a reinforcing annular member 17, and also the frusto-conical connecting part extending between the annular member 17 and the annular flywheel body 13 may be backed up by mutually axially spaced reinforcing annular members 18. The annular members 17 and 1 may be of the same type as the reinforcing annular members 14.

FIG. 3 shows an embodiment in which the shaft 10 comprises a pair of oppositely arranged conical hollow shaft parts 12 the opposite free ends of which are welded or otherwise interconnected so as to define a closed inner shaft cavity 19. The maximum diameter of the interconnected hollow shaft parts 12 is substantially smaller than the inner diameter of the annular flywheel body 13, and the hollow shaft parts 12 are interconnected with the annular flywheel body 13 by means of a frusto-conical connecting part 16 as that described in connection with FIG. 2.

Figure 4:
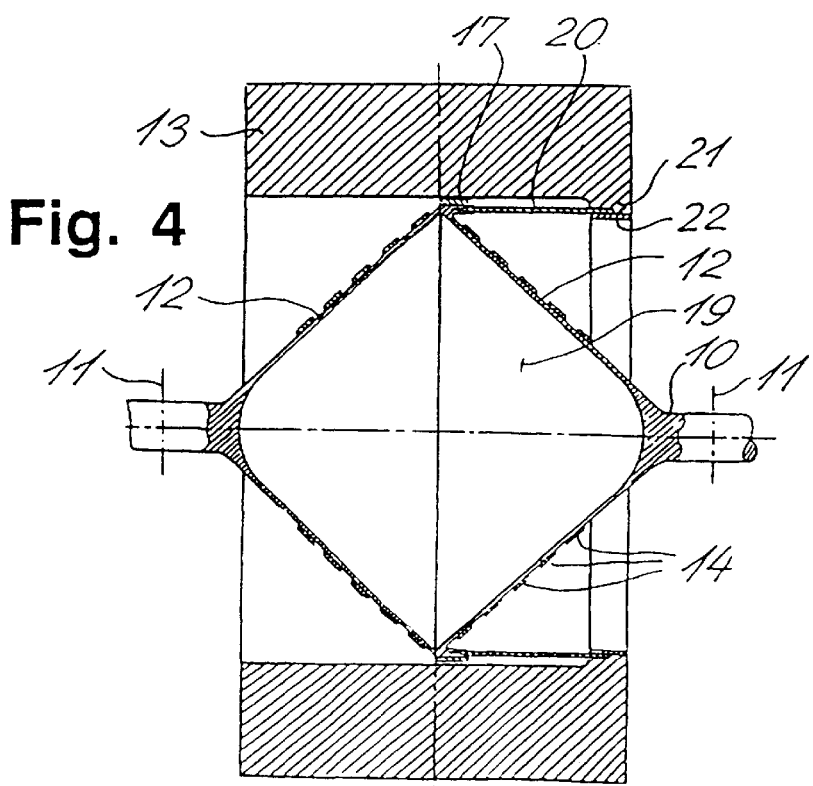

The embodiment shown in FIG. 4 corresponds to the embodiment shown in FIG. 3 with the exception that the frusto-conical connecting part 16 has been replaced by a circularly cylindrical connecting part 20. The maximum outer diameter of the interconnected conical hollow shaft parts 12 substantially corresponds to the inner diameter of a radially inwardly extending flange part 21. The shaft parts 12 comprise an outer surface part 12a, the axially inner end of the connecting part 20 may, for example, be received in an annular channel or groove defined in the adjacent hollow shaft part 12 as shown in FIG. 4 and may be fastened in the channel or groove by means of an adhesive or a glue. The outer edge portion of the cylindrical connecting part 20 may be heat sealed, fused or glued to an inner cylindrical surface part of the flange part 21 and may be covered by an inner annular member 22.

In the embodiment shown in FIG. 1 the conical metallic wall 12 may have sufficient flexibility to allow radial expansion of the annular flywheel body under the influence of centrifugal forces when the flywheel is rotating. In the embodiment shown in FIGS. 2–4 such radial expansion is made possible mainly by the connecting parts 16 and 20, respectively, which is preferably made from a flexible fiber reinforced plastics material.

The embodiment shown in FIG. 5 is of the type shown in FIGS. 3 and 4. However, in FIG. 5 the frusto-conical or cylindrical connecting part 16, 20 has been dispensed with, and oppositely directed cylindrical flanges 23 formed at the radially outer rim portions of the frusto-conical shaft parts 12 are connected directly to the annular body 13. As shown in FIG. 5 the cylindrical flanges 23 are connected directly to the inner peripheral surface of the annular body 13 by means of a layer of glue.

The inner surface of the annular body 13 may be defined by a layer 24 with nearly the same axial thermal expansion as that of the flanges 23 and the shaft 10. The layer 24 may be interrupted at the axially outer edges of the flanges 23 by annular grooves 25 formed in the inner peripheral surface of the annular body 13.

The flywheel shown in FIG. 5 is suited for operation with a moderate rotational speed, and the annular body 13 may be reinforced by peripherally extending, relatively strong fibres, such as carbon fibres, which are able to restrict radial expansion due to centrifugal forces to an acceptable value.

The flywheel shown in FIG. 6 is similar to that shown in FIG. 2. However, in FIG. 6 the conical hollow shaft part 12 has been replaced by a radial collar or flange 26 having a cylindrical or slightly conical annular rim portion or flange 27. The connecting part 16 is fastened to the inner surface of the rim portion 27 by a layer 28 of glue, such as epoxy, and one or more annular reinforcing members 14, which may contain fibres, is in abutting engagement with the outer surface of the rim portion 27.

EXAMPLE 1

In a flywheel as that shown in FIG. 4 the annular flywheel body 13 is made from strong carbon fibers having an ultimate strength of 7000 MPa and being arranged in a matrix of thermoplastic PEEK material. The annular body 13 further comprises a radially inner layer, which is 10 mm thick and which is made from glass fibers arranged in a matrix of PEEK material. The inner and outer diameters of the annular body are 320 mm and 460 mm, respectively, and the axial length is 250 mm. The annular body has a weight of 39 kg.

The shaft 10 and the hollow shaft parts 12 formed integrally therewith are made from a strong aluminum alloy Al 2124 having an ultimate strength of 490 MPa and elongation at fracture of 9%. The maximum diameter of the hollow shaft parts 12 is 300 mm, and the diameter of the circularly cylindrical shaft parts at 11 or the bearing diameter is 30 mm. The wall thickness of the radially outer part of each hollow shaft part 12 is approximately 1 mm, and this wall thickness is gradually increasing in radially inward direction. The top angle of each hollow shaft part 12 is 46°, and the axial distance between the bearing locations 11 is 330 mm.

The hollow conical shaft parts 12 are backed up by ten reinforcing annular members or rings 14 and an annular member or ring 17 at the inner joint between the connecting part 20 and the adjacent conical shaft part 12. The annular member 14 and 17 are made from peripherally extending carbon fibers having a high modulus of elasticity E=588 GPa and being arranged in a matrix of PEEK material. The width of the annular members is 10 mm and their radial thicknesses vary from 6 mm for the annular members with the larger diameter to 2 mm for the annular members having the smaller diameter. The axial component of the mutual distance between the annular members 14 is about 6 mm.

The circular cylindrical connecting part 20 is made from fiber reinforced plastics material and comprises an inner layer of generally axially extending carbon fibers and a pair of outer layers arranged on opposite sides of the inner layer and comprising generally peripherally extending carbon fibers. The carbon fibers in the inner and outer layers are embedded in a matrix of thermoplastic PEEK material and the carbon fibers at least in the outer layers has a relatively high modulus of elasticity E=588 GPa.

The connecting part 20 is connected to the adjacent conical hollow shaft part 12 by a double-sided glue joint having an axial width of 10 mm. The glue of the glue joint is epoxy. The connecting part 20 is connected to the flywheel body 13 by means of a similar glue joint.

The flywheel of the present example may rotate at a rotational speed which is about 50% higher than a similar flywheel where the annular members 14 and 17 reinforcing the conical shaft parts 12 have been dispensed with.

Thus, the flywheel of the present example may operate at a rotational speed of 34,000 rpm and with the peripheral speed of 820 m/sec. The flywheel may then store 9.5 MJ and may yield 1000 kW. The flywheel is dimensioned so as to be able to resist a moment of 1500 Nm caused by gyro forces. The shear stress to which the glue in the glued joint at the annular member 17 is exposed due to the moment caused by gyro forces is $\tau=1$ MPa. The transmission of 1000 kW at 34,000 rpm causes a shear stress $\tau=0.7$ MPa in the circularly cylindrical connecting part 20. The shear stress appearing in the glued joint adjacent to the annular member 22 is somewhat higher than the shear stresses in the joint adjacent to the annular member 17. However, all of the shear stresses are exceptionally low.

When the flywheel is rotating the radial elongation of the maximum diameter of the hollow shaft parts 12 is 0.6 mm.

EXAMPLE 2

A flywheel as that shown in FIG. 5 has an annular body 13 reinforced by carbon fibres with a high modulus of elasticity to restrict the radial expansion of the annular body under the influence of centrifugal forces. The weight of the annular body is 14 kg. The flywheel is able to accelerate a vehicle weighing 20 t from 0 to 50 km/h.

During operation the centrifugal forces causes generation of such a pressure between the cylindrical flanges 23 and the inner peripheral surface of the annular body 13 that even in case the glue bond fails the frictional forces generated between the engaging cylindrical surfaces of the flanges 23 and the annular body 13 are sufficient to counteract possible gyro forces and forces necessary for energy transfer between the shaft 10 and the annular body 13.

The annular body 13 may be made from a fibre reinforced material as described in example 1. However, in order to obtain substantially the same thermal expansion as that for the aluminum from which the shaft 10 and the cylindrical flanges 23 are made the epoxy layer 24 contains 62% of peripherally extending boron fibres and glass fibres. The boron fibres having a high modulus of elasticity may be arranged adjacent to the cylindrical flanges 23 for receiving the radially outwardly directed forces from the flanges 23 the glass fibres are positioned in a layer radially outside, but adjacent to the layer of boron fibres.

It should be understood that various changes and modifications of the embodiments described above could be made without departing from the scope of the present invention. Thus, the shaft 10 could be made of any suitable metal or metal alloy, such as steel, and the hollow shaft part 12 could extend from a hub part surrounding the shaft and being fixed thereto, for example by means of a key/keyway connection. Furthermore, the reinforcing annular members 14 may be replaced by a single layer of substantially peripherally extending fibers which are embedded in a layer of thermoplastic material. The thickness of the fiber layer may then vary along the length of the hollow shaft parts 12. The reinforcing fibers need not necessarily be carbon fibers but could be made from any other suitable material, such as boron. The matrix in which the reinforcing fibers are embedded may be of any suitable plastic material, such as epoxy or PEEK.

I claim:

1. A flywheel comprising:

an annular body, a metallic shaft extending axially through the annular body, connecting means for connecting the shaft to the annular body so as to allow radial expansion of the annular body under the influence of centrifugal forces, said connecting means comprising at least one metallic wall part, which is connected to and extends outwardly from the shaft, and which defines an inner cavity and an outer surface part, said outer surface part defining a surface of revolution, which is coaxial with the shaft and extends along an axial length of the shaft, bearing means for mounting the shaft and the annular member connected thereto rotationally around a longitudinal axis of the shaft, and a plurality of peripherally extending reinforcing fibers applied to said outer surface part for backing up the same so as to allow the flywheel to rotate at an increased rotational speed.

2. A flywheel according to claim 1, wherein each outer surface part defines a frusto-conical surface.

3. A flywheel according to claim 1, wherein the reinforcing fibers are embedded in plastics material applied to the outer surface part.

4. A flywheel according to claim 1, wherein the peripherally extending reinforcing fibers are formed into annular backing-up members, which are applied to the outer surface part.

5. A flywheel according to claim 1, wherein the annular body is made from fiber reinforced plastics material.

6. A flywheel according to claim 1, wherein the connecting means further comprises an annular wall part, which is made from fiber reinforced plastics material and extends between an outer free rim portion of the metallic wall part and the annular body.

7. A flywheel according to claim 1, comprising a pair of axially aligned hollow metallic wall parts having opposed open ends, which are interconnected so as to define a closed inner cavity.

8. A flywheel according to claim 7, wherein oppositely extending substantially cylindrical flanges are formed on radially outer rim portions of the metallic wall parts, the cylindrical flanges being fastened to an inner peripheral surface of the annular body.

9. A flywheel according to claim 1, wherein each outer surface part defines a conical surface.

10. A flywheel according to claim 1, wherein the hollow metallic wall part extends axially from a radial flange formed on the shaft.

11. A flywheel according to claim 10, wherein the outer surface part defined by the metallic wall part is slightly conical.

12. A flywheel according to claim 1, wherein a total strength of the backing-up fibers per unit of shaft length increases with increasing diameter of the surface part.

13. A flywheel according to claim 1, wherein a diameter of a radially outer edge portion of the hollow metallic wall part corresponds to a diameter of an inner portion of the annular body to which the metallic wall part is connected.

14. A flywheel according to claim 1, wherein the outer surface part of each said metallic wall part is frusto-conical, the reinforcing fibers being dimensioned and arranged on an outwardly diverging surface part defined thereon so as to obtain at maximum rotational speed of the flywheel such a deflection of each metallic wall part that a generatrix of its diverging outer surface part attains an S-shape, while stresses generated in the material of the metallic wall part do not exceed an allowable value.

15. A flywheel according to claim 14, wherein an angle defined by the shaft axis and a tangent angle of a generatrix at a radial outer location of the metallic wall part remains substantially unchanged when the rotational speed of the flywheel is increased from zero to its maximum rotational speed.

* * * * *